(12) United States Patent
Dahl et al.

(10) Patent No.: US 10,309,369 B2
(45) Date of Patent: Jun. 4, 2019

(54) WIND TURBINE BLADE HAVING A ROOT REGION WITH ELONGATED FASTENING MEMBERS PROVIDED WITH METAL FIBRES

(75) Inventors: Martin Dahl, Flensburg (DE); Bjarne Krab Mortensen, Billund (DK); Benjamin Hornblow, Copenhagen O (DK)

(73) Assignee: LM WP PATENT HOLDING A/S, Kolding (DK)

( * ) Notice: Subject to any disclaimer, the term of this patent is extended or adjusted under 35 U.S.C. 154(b) by 1253 days.

(21) Appl. No.: 14/110,890

(22) PCT Filed: Apr. 11, 2012

(86) PCT No.: PCT/EP2012/056532
§ 371 (c)(1),
(2), (4) Date: Oct. 9, 2013

(87) PCT Pub. No.: WO2012/140048
PCT Pub. Date: Oct. 18, 2012

(65) Prior Publication Data
US 2014/0030094 A1    Jan. 30, 2014

(30) Foreign Application Priority Data

Apr. 11, 2011  (EP) .................................... 11161892
Apr. 11, 2011  (EP) .................................... 11161908

(51) Int. Cl.
*F03D 1/06*       (2006.01)
*B29C 70/88*     (2006.01)

(52) U.S. Cl.
CPC .......... *F03D 1/0658* (2013.01); *B29C 70/885* (2013.01); *F03D 1/0675* (2013.01);
(Continued)

(58) Field of Classification Search
CPC ..................................................... F03D 1/0658
See application file for complete search history.

(56) References Cited

U.S. PATENT DOCUMENTS 7,163,378 B2 *  1/2007  Kildegaard ........... B29C 70/525
                                                        416/230
7,517,194 B2 *  4/2009  Doorenspleet ........ F03D 1/0658
                                                        416/204 R
(Continued)

FOREIGN PATENT DOCUMENTS

DE    196 25 426 A1    1/1998
EP      1 463 625        10/2004
(Continued)

*Primary Examiner* — Richard A Edgar
*Assistant Examiner* — Michael L Sehn
(74) *Attorney, Agent, or Firm* — Nath, Goldberg & Meyer; Jerald L. Meyer; Tanya E. Harkins

(57) ABSTRACT

A wind turbine blade for a wind turbine is a shell structure of a fibre-reinforced composite and comprises a root region and an airfoil region. The root region has ring-shaped cross section and comprises a plurality of elongated bushings 7 with an inner thread 22 and embedded interspaced in the fibre-reinforced polymer so as to substantially follow the circumference of the root region and allow access from the outside to the inner threads. Each fastening member 7 is provided with a notch 60' in the periphery 11 thereof. A rod-shaped locking element 61 passes through the notch 60' in engagement therewith. The locking element 61 is fixedly and tightly fitting arranged in a through-going circular bore 65 extending through the wall of the root region.

30 Claims, 10 Drawing Sheets

(52) U.S. Cl.
CPC ..... *F05B 2230/21* (2013.01); *F05B 2230/237* (2013.01); *F05B 2230/238* (2013.01); *F05B 2280/10* (2013.01); *F05B 2280/1071* (2013.01); *F05B 2280/4003* (2013.01); *F05B 2280/6003* (2013.01); *F05B 2280/6013* (2013.01); *F05B 2280/702* (2013.01); *Y02E 10/721* (2013.01); *Y02P 70/523* (2015.11)

(56) References Cited

U.S. PATENT DOCUMENTS

| 2009/0263250 | A1* | 10/2009 | Quell | F03D 1/0658 |
| | | | | 416/204 R |
| 2009/0324420 | A1* | 12/2009 | Arocena De La Rua | B29C 70/865 |
| | | | | 416/248 |
| 2010/0290912 | A1* | 11/2010 | Sorensen | F03D 1/0658 |
| | | | | 416/204 R |

FOREIGN PATENT DOCUMENTS

| EP | 2 138 716 A1 | 12/2009 |
| WO | 2010/018225 A2 | 2/2010 |

\* cited by examiner

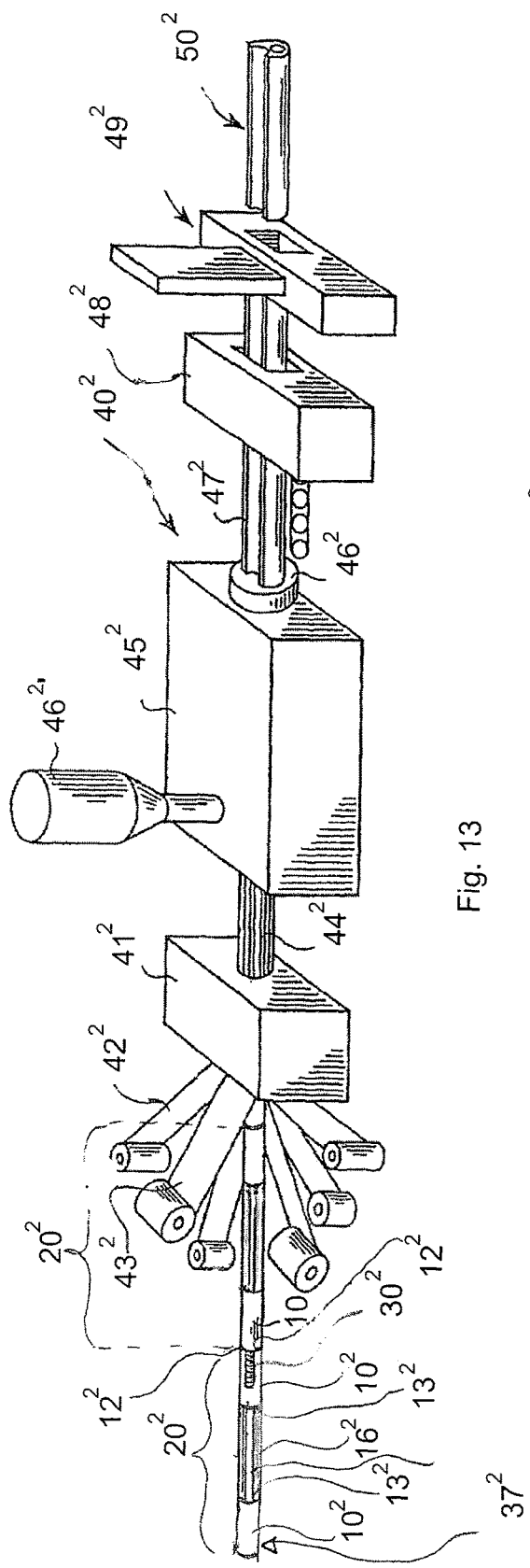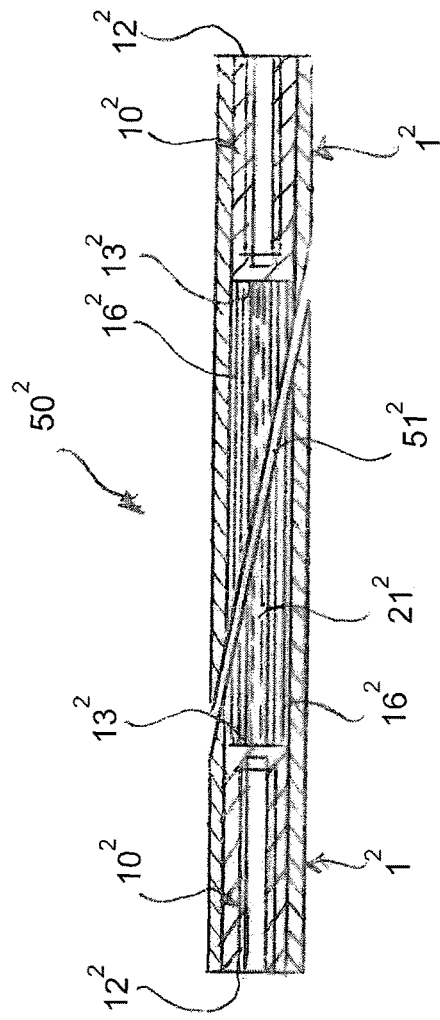

WIND TURBINE BLADE HAVING A ROOT REGION WITH ELONGATED FASTENING MEMBERS PROVIDED WITH METAL FIBRES

This is a National Phase Application filed under 35 U.S.C. § 371 as a national stage of International Application No. PCT/EP2012/056532, filed Apr. 11, 2012, claiming the benefit from European Patent Application No. 11161892.2, filed Apr. 11, 2011, claiming benefit from European Patent Application No. 11161908.6, filed Apr. 11, 2011, the entire content of each of which is hereby incorporated by reference in its entirety.

TECHNICAL FIELD

The present invention relates to a wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and optionally a transition region between the root region and the airfoil region, the root region having a ring-shaped cross section with an outer surface and an inner surface, the root region comprising a plurality of elongated fastening members provided with fastening means and embedded mutually spaced apart in the fibre-reinforced polymer so as to substantially follow a circumference of the root region and allow access from the outside to the fastening means used for mounting the blade to the hub, the fastening members comprising a first end arranged at the root end face, a second end opposite the first end thereof, an outer surface, an inner surface, a first lateral face and an opposite second lateral face.

BACKGROUND ART

Wind turbine blades and thereby also the root region thereof are often made by assembling two blade halves essentially corresponding to the suction side and the pressure side, respectively, along the chord plane. However, the blades may also be moulded in their entirety by so-called hollow moulding.

The root region comprises layers of fibres forming an outer layer and an inner layer between which fastening members in the form of bushings are placed. A separately formed insert may be placed between each pair of adjacent bushings, whereby the bushings are mutually separated by the inserts. The known inserts are made of glass fibres embedded in a suitable resin.

A potential problem in connection with wind turbine blades is load transfer from the fibre composite structure of the root region to the hub of the wind turbine. The connection and transfer of loads from the blade to the hub is inter alia provided by mounting the blade to the hub by screwing bolts into the bushings placed in the root or by means of nuts screwed onto stud bolts screwed into the bushings. In case the number of bolts and thereby the number of bushings has to be increased to handle a given load, remaining area of the fibre composite material between the bushings is reduced. This may result in the root connection being insufficiently supported to withstand the loads, whereby the connection between the blade root and the hub may fail since the bushings are insufficiently retained in the composite material and thus pulled out of the composite material of the root region. This is especially a problem when long and thereby heavy blades are to be used.

WO 2010/018225 provides a method of manufacturing a wind turbine blade comprising a steel wire or steel fibre-reinforced polymer matrix. However, the document does not address the problem of how the root region is to be designed to withstand extreme loads in the connection between the blade root and the hub.

EP 2 138 716 describes a blade insert provided in the lamination of a wind turbine blade. The insert is made up of two parts, namely a head and a body. The head is designed so as to be able to screw the insert onto another structure. The body has a cylindrical exterior and has a conical cavity. Thereby, the body provides a smooth transition to the blade laminate.

DE 196 25 426 discloses a rock anchor comprising a core element made of polymer and provided with outer threads. The outer part of the rock anchor is reinforced with glass fibres. The anchor is particularly suited for non-conductive, non-magnetic and dielectric parts.

EP 1 463 625 discloses a method of manufacturing root end bushings with wedges provided in extension of the bushings.

DISCLOSURE OF THE INVENTION

It is an object of the invention to provide a wind turbine blade with a root region overcoming at least one of the drawbacks of the prior art or at least provides a useful alternative.

According to a first aspect of the invention, a wind turbine blade of the type described is provided with a root region, wherein at least one of the elongated fastening members comprises metal fibres, a first end thereof being firmly fixed to the fastening member and the remaining portion thereof extending outwardly from the fastening member and being embedded in the polymer matrix of the fibre-reinforced composite material.

The metal fibres firmly fixed to the fastening member and embedded in the polymer matrix of the composite material provides an improved retention of the fastening member, as both the fastening member and the metal fibres firmly fixed thereto are retained in the polymer matrix. As a result, the blades are reliably secured to the hub of the wind turbine. Due to the improved retention of the fastening members, it is possible to attach longer and thereby heavier blades to the hub without increasing the diameter of the root region and/or the number of fastening members. Further, the metal fibres, advantageously steel fibres, have material properties that are compatible with the fastening means, since these are typically made of metal and often steel.

Further, due to use of metal fibres the manufacturing time of a blade or blade halves may be reduced compared to conventional methods, wherein metal fibres are not used, such as forming the blade or blade halves by means of pre-impregnated fibres or by means vacuum assisted resin transfer moulding, VARTM. This is especially due to the properties of the surface of metal fibres compared to the conventional fibres, such as glass fibres. Finally, metal is a better heat conductor than glass fibres, whereby the curing process may be improved.

According to an embodiment of the invention the outwardly extending portion of the fibres may end in a second fibre end.

It is preferred that the metal fibres have an outer free second end. However, it should be noted that it is also possible to firmly fix both the first and the second fibre end to the fastening member so that the metal fibres form a loop being embedded in the polymer matrix of the fibre-reinforced composite material.

According to another embodiment the metal fibres are firmly fixed to the second end of the fastening member.

According to a further embodiment of the invention the above metal fibres may be firmly fixed to an outer surface of the fastening member.

The metal fibres may be firmly fixed to the fastening member by casting, gluing, soldering or brazing.

The choice of method depends on the material of the elongated fastening member and the metal fibres.

It should be noted that the first fibre end also may be firmly fixed to the fastening member by mechanical means. As an example, the first end of the metal fibres may be firmly clamped between portions of the fastening members, such as in a compressed opening in the fastening member.

According to a further embodiment of the invention at least 50, 60, 70, 80, 90 or 100% of the fastening members may be provided with firmly fixed metal fibres.

It is preferred that all of the fastening members are provided with firmly fixed metal fibres so that the retention of all of the fastening members is improved and an optimum connection between the blade the hub is obtained.

According to yet another embodiment, the metal fibres may have an E-modulus being at least twice and preferably thrice the E-modulus of glass fibres, the metal fibres preferably being steel fibres.

As a result, a suitable retention of the fastening members is obtained.

According to a further embodiment, the metal fibres may have a cross section in a range between 0.04 mm and 1.0 mm or in a range between 0.07 and 0.75 mm or in a range 0.1 and 0.5 mm.

According to another embodiment, the metal fibres may be fixed to the fastening member as a bundle of fibres.

In this embodiment the fixation of the metal fibres to the fastening members is facilitated as compared to fixing the fibres separately to the fastening members.

Additionally, the metal fibres may extend from the fastening members in such manner that they are arranged in at least one separate layer of the fibre-reinforced composite material.

One or more layers comprising metal fibres may be arranged up to the layer comprising metal fibres. The layer may comprise metal fibres or fibres different from metal fibres, e.g. be without metal fibres.

The at least one separate layer comprising metal fibres may comprise 20, 30, 40, 50, 60, 70, 80, 90 or 100% by volume of metal fibres, the remaining fibres being a different type of fibres than metal fibres, preferably glass and/or carbon fibres.

The metal fibres may extend outwardly from the fastening members in a mutually diverging manner.

The metal fibres may extend from the fastening members in a fan-shaped manner so as to be arranged in a common plane. Optionally, the metal fibres may extend from the fastening members in a cone-shaped manner.

According to another embodiment, the fastening members may be bushings preferably having a uniform cross section and the fastening means may be a thread in a bore in the bushing.

The fastening member may, however, also be a rod preferably having a uniform cross section and the fastening means may be an outer thread of the rod.

The fastening members may preferably be made of metal, preferably steel.

Further, the fastening members and the metal fibres firmly fixed thereto may be made of the same material or compatible materials.

Thereby, the fixation of the fibres to the fastening members is facilitated.

According to a further embodiment, the root region may comprise intermediate retaining means comprising metal fibres, preferably steel fibres, and arranged in the regions between adjacent interspaced lateral surfaces of the fastening members, preferably in each region between adjacent fastening members, and preferably extending at least from the first to the second end of the fastening members when seen in the longitudinal direction of the blade.

The intermediate retaining means may comprise a number of first layers comprising metal fibres and preferably also a number of intermediate second layers comprising a different type of fibres than metal fibres, preferably glass and/or carbon fibres.

The intermediate retaining means may advantageously be formed as separate inserts embedded in the polymer matrix, said inserts comprising a first insert part substantially corresponding to the region between the lateral faces of adjacent fastening members.

By using intermediate retaining means comprising metal fibres, the rigidity of the root region is improved, thereby also improving the retention of the fastening members.

The polymer of the fibre-reinforced composite material may be epoxy, polyester, vinylester or any suitable polymer and in addition to metal fibres the fibres of the fibre-reinforced composite material are preferably carbon and/or glass fibres.

The outer surface of the fastening members may be corrugated, whereby the surface area of the fastening members is increased and provides an enhanced retention of the fastening members in the surrounding polymer matrix.

The phrase "metal fibres" also covers metal filaments and metal wires.

Further, the metal fibres may be coated with another metal in order to improve the adherence to the polymer matrix. As an example, steel fibres may be coated be with zinc or brass.

Additionally, the metal fibres may be incorporated into mats or strips comprising fibres, which may be chopped fibres, or arranged unidirectionally or multi-directionally.

Advantageously, the fastening members (or the bushing) are bonded into the composite material of the root region. More advantageously, the fastening members are laminated into the composite material of the root region.

The majority of the blade may be reinforced with fibres of another type, typically glass fibres or carbon fibres. In particular the profiled region of the blade having an airfoil profile and the transition region may be reinforced by such fibres. Thereby only the root region and optionally only the region, wherein the bushings are laminated into the composite structure, may be reinforced by metal fibres, advantageously being steel fibres.

According to a second aspect, the invention provides an embedding element for embedment in the root of a wind turbine blade of a fibre-reinforced composite material is elongated and has a first end and an opposite second end, a first longitudinal lateral face and an opposite second longitudinal lateral face, an upper face and a lower face interconnecting the lateral faces, the embedding element is formed of a fibre-reinforced composite material comprising fibres embedded in a polymer matrix and comprises an elongated fastening element of metal having an outer surface, a first end and an opposite second end, and a fastening means accessible from the first end, said fastening element being embedded in the fibre-reinforced composite material, said first end of the fastening element being arranged at the first end of the embedding element, wherein a fastening element of an embedding element of the above described type is provided with metal fibres, a first end thereof being firmly fixed to the fastening element and remaining portion thereof extending outwardly from the fastening element and being embedded in the fibre-reinforced polymer matrix of the embedding element.

The adherence of the metal fibres to the polymer matrix and the firm fixation of the metal fibres to the fastening element provide for an improved retention of the fastening element in the embedding element. Additionally, the metal fibres improve the rigidity of the embedding element. As a result, the embedding element provides for an increased strength of the retention of the embedding element in the blade and thereby an improvement of the strength of the fixation of the blade to the hub of the wind turbine.

The fastening element may be embedded in the fibre-reinforced composite material of the embedding element, except for the first end of the fastening element being arranged at the first end of the embedding element.

The polymer matrix may be a resin such a polyester, epoxy or vinylester, however, any appropriate polymer can be used.

The fibres of the fibre-reinforced composite material may be any appropriate fibres, however, at present glass fibres and/or carbon fibres and/or metal fibres, especially steel or iron fibres, are preferred.

The fibre-reinforced composite material of the wind turbine blade and/or the root thereof may comprise the same polymer and fibres as mentioned above for the fibre-reinforced composite material of the embedding element.

According to an embodiment, the outwardly extending portion of the metal fibres ends in a second fibre end.

It is preferred that the metal fibres have an outer free second end. However, it should be noted that it is also possible to firmly fix both the first and the second fibre end to the fastening element so that the metal fibres form a loop being embedded in the polymer matrix of the fibre-reinforced composite material of the embedding element.

According to a further embodiment, the metal fibres are firmly fixed to the second end of the fastening element.

According to a further embodiment, the metal fibres are firmly fixed to the outer surface of the fastening element.

The metal fibres may be firmly fixed to fastening element by casting, gluing, soldering or brazing.

The choice of the method for firmly fixing the fibres to the fastening elements depends on the material of the elongated fastening element and the metal fibres.

It should be noted that the metal fibres may also be firmly fixed to the fastening element by mechanical means. As an example, the first end of the metal fibres may be firmly clamped between portions of the fastening element such as in a compressed opening in the fastening element.

According to a further embodiment, the metal fibres have an E-modulus being at least twice and preferably thrice the E-modulus of glass fibres.

According to an additional embodiment, wherein the metal fibres have a cross-section in the range between 0.04 mm and 1.0 mm or in a range between 0.07 mm and 0.75 mm or in a range between 0.1 mm and 0.5 mm.

The metal fibres may be fixed to the fastening elements as single fibres or as one or more bundle(s). The use of one or more bundles of fibres is preferred.

According to a further embodiment, the fibres are iron or steel fibres.

In a further embodiment, the elongated fastening element has a substantially uniform cross-section between the first and the second end thereof.

The elongated fastening element may have a substantially circular cross-section, whereby the manufacturing thereof is facilitated.

In an addition embodiment, the fastening element has a corrugated outer surface.

The corrugated outer surface of the fastening element provides an improved adherence thereof to the polymer matrix of the fibre-reinforced composite material of the em-bedding element.

The fastening means of the fastening element may be an inner thread in a longitudinal bore. According to an additional embodiment, the elongated fastening element is made of iron or steel.

According to an embodiment, the embedding element has a substantially uniform cross-section over at least a portion of the length thereof.

The embedding element may have a substantially quadrangular cross-section over at least a portion of the length thereof, the upper and lower face of the embedding element being preferably substantially parallel over said portion or the length thereof.

The elongated element may have a substantially rectangular or trapezoid cross-section. The embedding element may, however, also have a circular cross-section.

According to a further embodiment, the embedding element tapers over at least a portion of the length thereof. The embedding element may taper in a direction from the first end thereof towards the second end thereof, and the tapering may be gradual so as to provide a wedge-shaped embedding element.

Preferably, the upper face of the embedding elements tapers towards the lower face thereof.

According to an additional embodiment, the first longitudinal lateral face of the embedding element extends substantially convexly in a cross-sectional view of the embedding element, and the second longitudinal lateral face of the embedding element extends substantially correspondingly concavely in a cross-sectional view of the embedding element.

Due to the concave and convex lateral surface juxtaposed embedding elements may be rotated in relation to each other, the first lateral face of each embedding element still engaging the second lateral face of the juxtaposed embedding element. The first and the second lateral face may have substantially circular convex and concave shape as see in a cross-sectional view. As a result thereof, it is possible to arrange juxtaposed embedding elements so as to form various curve shapes such as a circular cross-sectional shape of the blade root. The same type of embedding elements may thus be used for blade roots of different diameters.

The embedding element may be made by a method involving pultrusion, i.e. the fibre-reinforced composite material of the embedding element may be provided by pultrusion. It should, however, be noted that the fibre-reinforced composite material may be provided by any known method of producing products of a fibre-reinforced composite material. In addition to pultrusion suitable methods include dry lay up of fibre material which is subsequently supplied with a resin, e.g. RTM or VARTM, or lay up of pre-impregnated fibre material which is subsequently cured.

According to a third aspect, the present invention relates to a method of producing a wind turbine blade of a fibre-reinforced composite material, wherein a plurality of embedding elements are such embedded in juxtaposition in the polymer matrix of the fibre-reinforced composite material of the wind turbine blade that they follow the circumference of the root region, the first lateral face of each embedding element engaging the second lateral face of the juxtaposed embedding element and allowing access to the outside to the fastening means, which may be used for securing the blade to the hub of the wind turbine blade. The fastening means of the fastening element may be an inner thread in a longitudinal bore.

Although this embodiment is a preferred embodiment, the fastening means of the fastening element may also be an outer threaded rod-shaped part of the fastening element extending from the first end thereof.

The various aspects of the invention may be combined in any way.

BRIEF DESCRIPTION OF THE DRAWINGS

The invention is explained in greater detail below with reference to the drawings, in which FIG. 12 is a longitudinal sectional view of a blank from which two embedded elements can be made, the blank being shown in a state where it has been cut to provide the two embedding elements, FIG. 13 is a schematic view of a pultrusion system for manufacturing a pultruded string from which the blank shown in FIG. 12 can be cut.

DETAILED DESCRIPTION OF THE INVENTION

Figure 1:
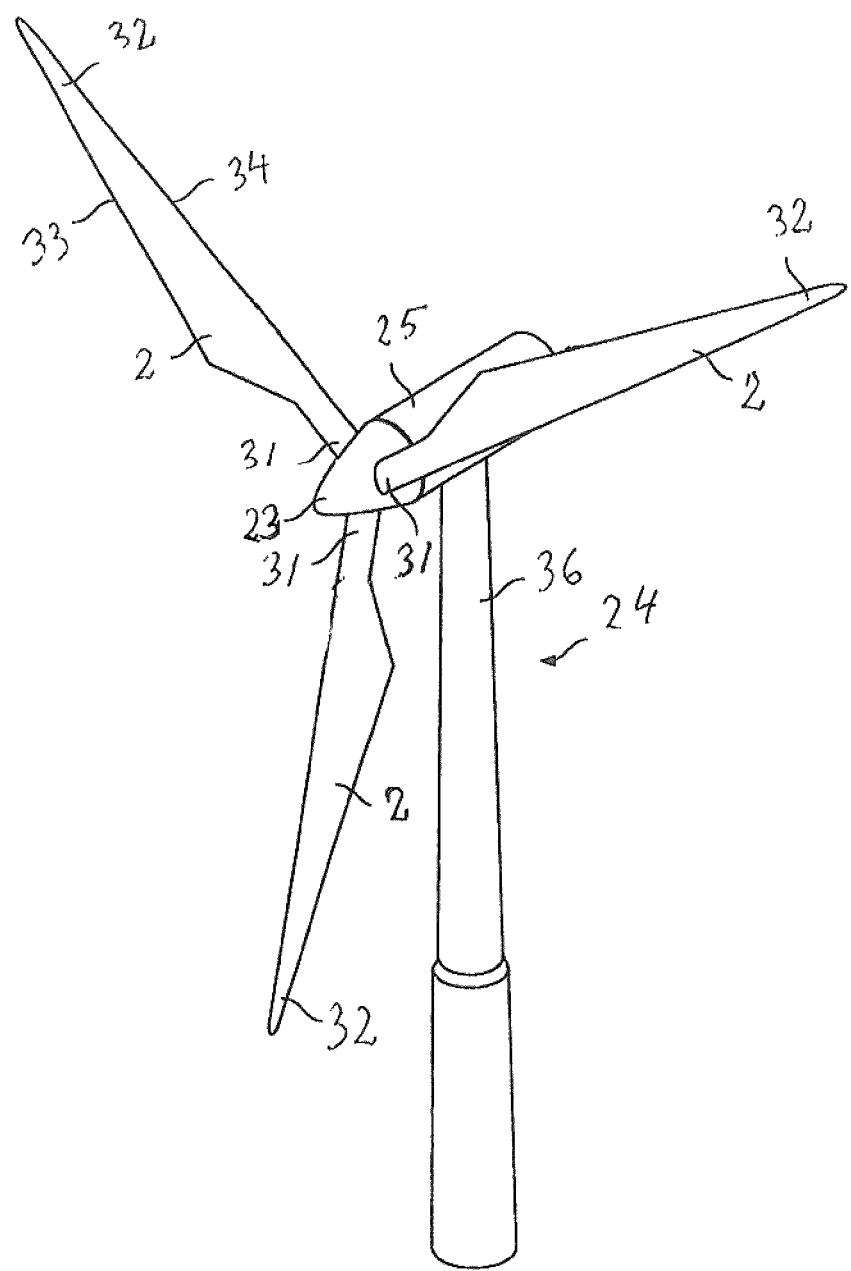
FIG. 1 shows a wind turbine.

FIG. 1 illustrates a conventional, modern upwind turbine 24 according to the so-called "Danish concept" with a tower 36, a nacelle 25 and a rotor with a substantially horizontal rotor shaft. The rotor includes a hub 23 and three blades 2 extending radially from the hub 23, each having a blade root 31 nearest the hub, and a blade tip 32 furthest from the hub 23.

Figure 2:
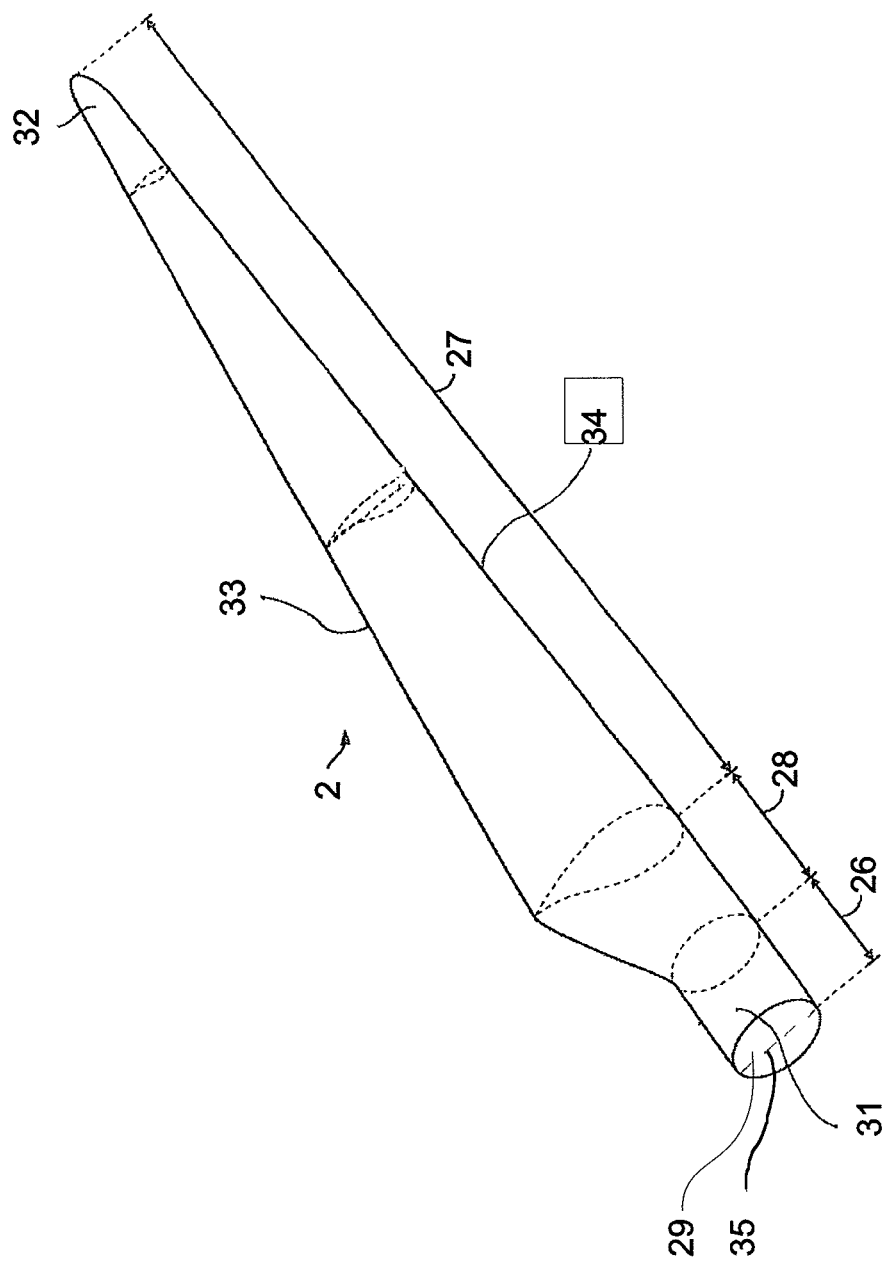
FIG. 2 is a diagrammatic perspective view of a wind turbine blade according to the invention.

As evident seen from FIG. 2, the blade 2 comprises a root region 26 with a root end face 29 closest to the hub, an airfoil region 27 furthest away from the hub, and a transition area 28 between the root region 26 and the airfoil region 27. The airfoil region 27 has an ideal or almost ideal blade shape, whereas the root region 26 has a substantially circular cross section, which reduces storm loads and makes it easier and safer to mount the blade 2 to the hub 23. Preferably, the diameter of the blade root 31 is constant along the entire root region 26. The transition region 28 has a shape gradually changing from the circular shape of the root region 26 to the airfoil profile of an airfoil region 27. The width of the transition region 28 increases substantially linearly with increasing distance from the hub 23.

The blade is often made of two blades halves assembled by being glued or bolted together substantially along a chord plane 35 of the blade. The blade 2 comprises a leading edge 34 facing the rotational direction of the blade 2 when the blade 2 is mounted on the hub 23 and a trailing edge 33 facing in the opposite direction of the leading edge 34. The chord plane 35 extends between the leading edge 34 and the trailing edge 33 of the blade 2. It should be noted that the chord plane does not necessarily run straight over its entire extent, since the blade may be twisted and/or curved, thus providing a chord plane with a correspondingly twisted and/or curved course, this being most often the case in order to compensate for the local velocity of the blade being dependent on the radius from the hub. Due to the circular cross section, the root region 26 does not contribute to the production of the wind turbine and, in fact, it lowers the production slightly due to the wind resistance.

Figure 3:
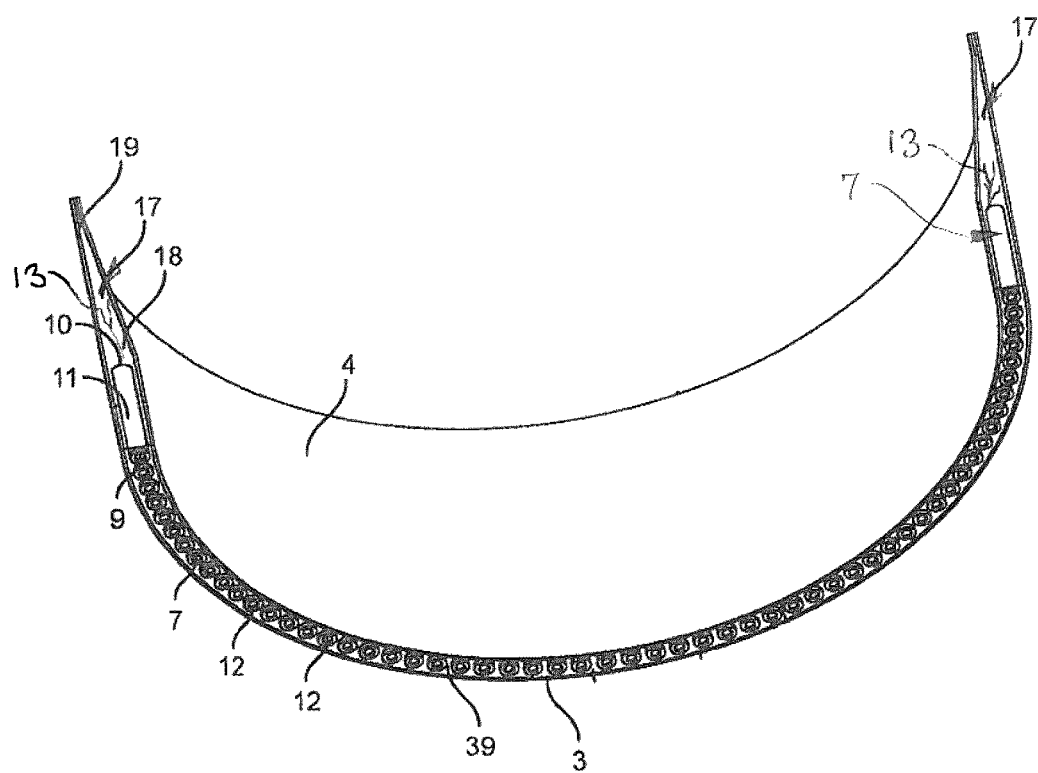
FIG. 3 is a perspective, longitudinal, sectional view of a portion of a root region of a first embodiment of a wind turbine blade according to the invention comprising a first embodiment of fastening members provided with metal fibres.
Figure 4:
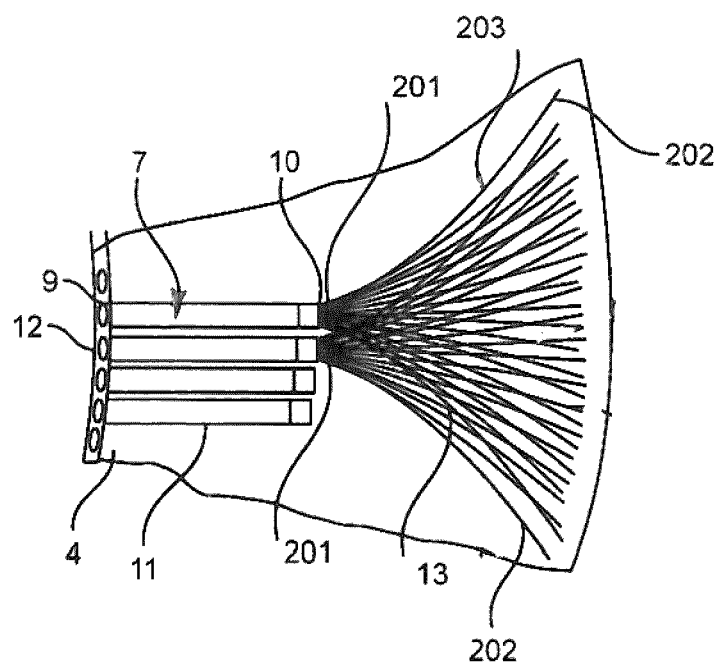
FIG. 4 shows a portion of the root region shown in FIG. 3.
Figure 5:
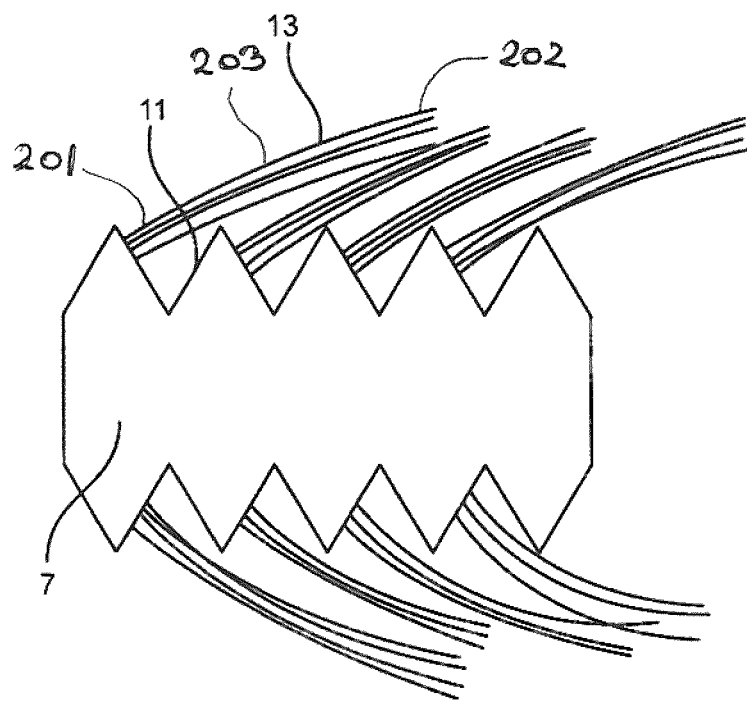
FIG. 5 is a diagrammatic view of a second embodiment of an elongated fastening member provided with metal fibres firmly fixed thereto.

As seen in FIGS. 3 and 4, the blade including the root region 26 is formed as a shell structure. The shell structure of the root region 26 is ring-shaped and comprises an outer surface 3 formed by an outer layer of a fibre-reinforced polymer matrix advantageously of glass fibres and/or carbon fibres and a resin, such as epoxy, polyester or vinylester, and an oppositely arranged inner surface 4 formed by an inner layer being made of the same material as the outer layer. Elongated fastening members 7 with fastening means 22 are placed between the layers 5, 6. Advantageously, the elongated fastening members 7 are bushings having a circular cross section and comprise a central bore 12 with an inner thread 22 as fastening means. The bushing 7 comprises a first end 9 and an oppositely arranged second end 10. The first end 9 of the bushing 7 is placed at the root end face 29 of the root region. The bushings 7 are arranged mutually spaced apart so as to substantially follow the circumference of the root region and allow access from the outside to the fastening means 22, i.e. the threads used for mounting the blade to the hub. Seen relative to the root region, the outer periphery 11 of the fastening members 7 comprises a radially outer surface, an opposite radially inner surface, a first lateral face, and an opposite lateral face, as shown in FIG. 5.

Intermediate retaining means comprising metal fibres 13 is arranged in each region between adjacent interspaced lateral surfaces 11c, 11d of the fastening members 7, i.e. in the present example the bushings. Further, in the present embodiment the intermediate retaining means are formed of separately manufactured inserts 39. As it appears from FIG. 9, the inserts 39 comprise a first insert part 40 and a second insert part 41. The first insert part 40 essentially corresponds to the region between the lateral faces 11c, 11d of adjacent bushings 7 and is provided with opposite lateral faces 42, 43 formed complimentary to the lateral faces 11c, 11d of the adjacent bushings 7. The inserts 39 substantially extend up next to the adjacent bushings when seen in circumferential direction. Further, the first insert part 40 extends from the first end of the bushings 7 and beyond the second end thereof, as clearly seen in FIG. 9. The second insert part 41 is a wedge-shaped tapering extension of the first insert part 40. As seen in radial direction of the root region, the first insert part 40 has an extent substantially corresponding to that of the bushings.

Figure 9:
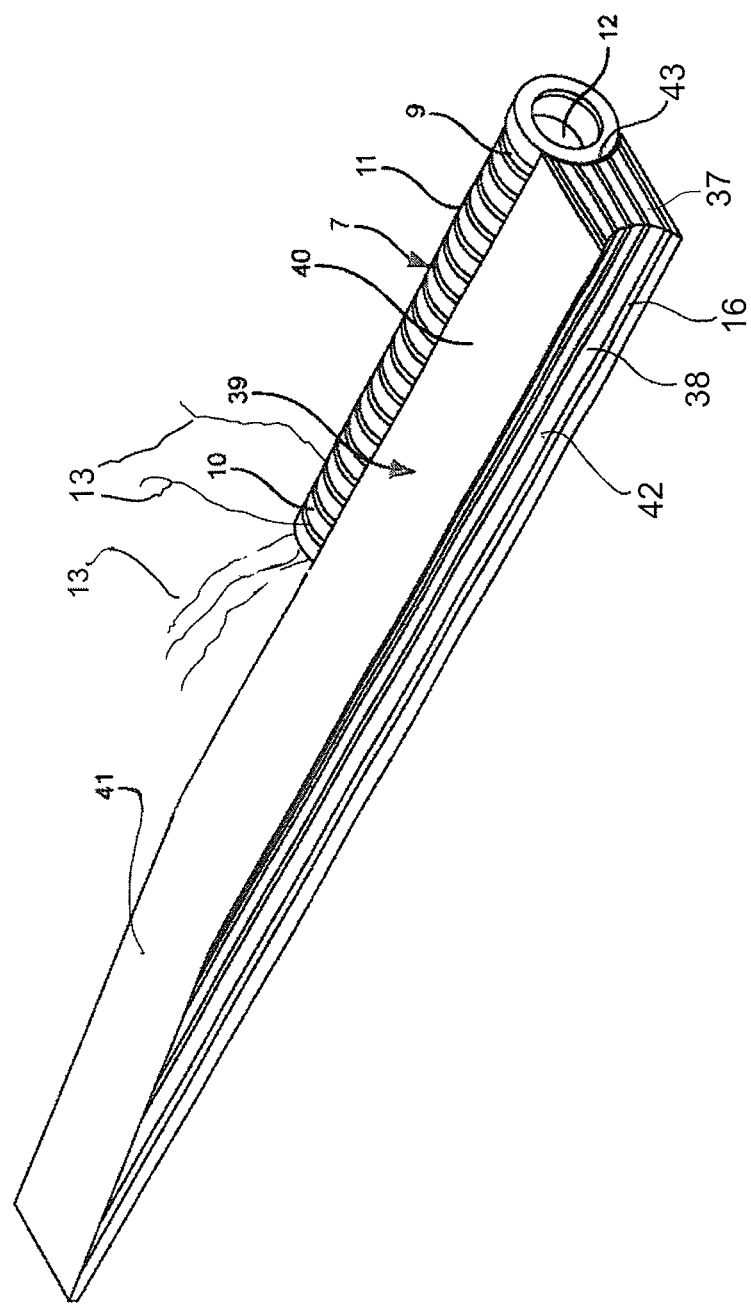
FIG. 9 shows in an enlarged scale a detail of FIG. 3 and discloses a fastening member in form of a bushing arranged next to a separate pre-made insert.

As seen in FIG. 9, the intermediate retaining means formed of the separately manufactured and pre-formed insert 39 comprises a number of first layers 16 comprising metal fibres and intermediate second layers 37 comprising a second fibre material 38 differing from the metal fibres. The first layers 16 comprising metal fibres 13 may be formed of mats comprising metal fibres. The metal fibres are preferably of a material having an E-modulus of at least twice, preferably thrice the E-modulus of glass fibres. A preferred material for the metal fibres is steel. The steel fibres or steel filaments may also be formed into steel wires having a cross-sectional dimension in the range between 0.04 mm and 1.0 mm, or in the range between 0.07 mm and 0.75 mm in the range between 0.1 mm and 0.5 mm. The second layers 37 comprising a different type of fibres than metal fibres preferably comprise glass and/or carbon fibres. The layers 37 may be formed of fibre mats. During manufacture of the inserts 39 the layers comprising the metal fibres and the layers comprising a second type of fibres differing from the metal fibres are embedded in a suitable resin such as polyester, epoxy or vinylester. One of the suitable methods for manufacturing the inserts 39 is pultrusion, whereby elongated fibre-reinforced products having a uniform cross section may be produced.

As seen in FIG. 3, a wedge-shaped element 17 is arranged behind each bushing 7 as seen in the longitudinal direction of the blade. A first end 18 of the element 17 is arranged in abutment with the second end of the bushing 7, and a second end 19 of the element 17 is tapered. The wedge-shaped elements 17 are made of balsawood or a hard polymer foam or another similar material. In a longitudinal sectional view, the bushing 7 and the abutting wedge-shaped element 17 have a shape corresponding to the shape of the insert 39 so that the wall thickness of the root region decreases gradually in the longitudinal direction of the blade.

As shown in FIGS. 3-4, the bushings 7 are provided with metal fibres 13 having a first fibre end 201 and an opposite second fibre end 202. The first fibre end 201 of the metal fibres is firmly fixed to the second end 10 of the bushing 7, especially the end face of the bushing 7. A portion 203 of the metal fibres extends outwardly from said end face. As mentioned, the metal fibre 13 may be fixed to the end face of the bushings 7 and/or close thereto at the outer surface 11 of the bushings 7.

As shown in FIG. 4, the fibres 13 extend from the second end 10 of the bushing 7 in a fan-shaped manner so that the distance between the second fibre ends 202 of adjacent fibres exceeds the distance between the first ends 201 of adjacent fibres. The outwardly extending portions 203 of the metal fibres 13 are embedded in the polymer matrix of the fibre-reinforced composite material of the root region. In addition to the metal fibres 13 the fibre-reinforced composite material of the root region comprises additional fibres, which also may be metal fibres and/or fibres other than metal fibres such as carbon and/or glass fibres. Preferably, the metal fibres are steel fibres and may be firmly fixed to the bushings 7 by welding, casting, gluing, soldering or brazing depending on the considered most suitable method and further depending on the material of the fibres and the bushings 7. The metal fibres may, however, also be firmly fixed to the bushings 7 by mechanical means. As an example, the first fibre end of the metal fibres 13 may be firmly clamped between portions of the bushings 7 such as in a compressed opening in the bushing 7.

FIG. 5 shows a second embodiment of the bushing 7 comprising metal fibres 13 firmly fixed to the outer periphery 11 of the bushing 7. The outer periphery of the bushing 7 is corrugated so as to increase the surface area thereof.

Figure 6A:
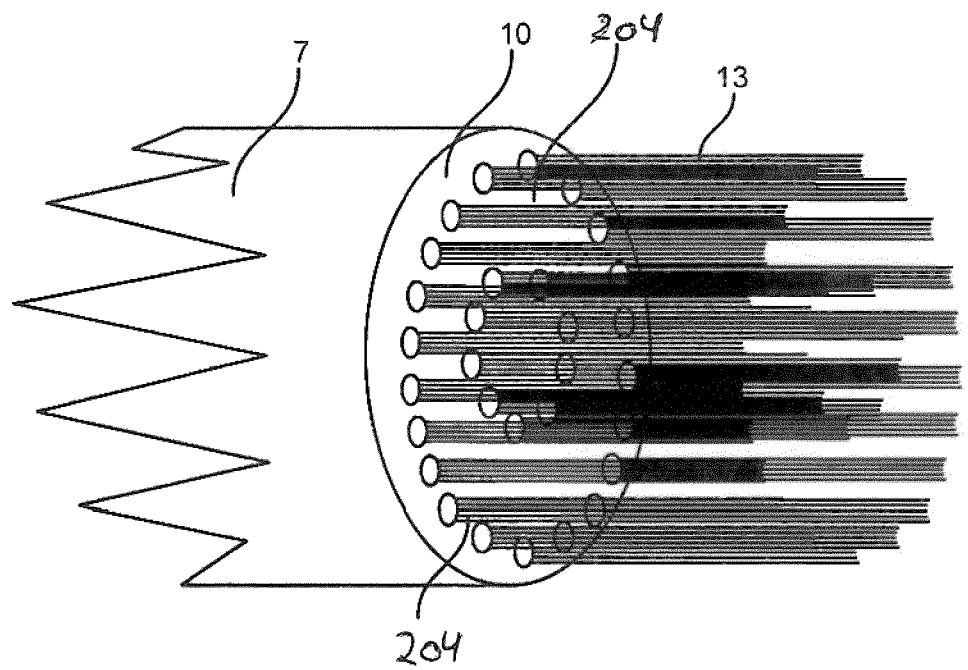
FIG. 6A shows a third embodiment of an elongated fastening member provided with metal fibres firmly fixed thereto.

FIG. 6A shows a third embodiment of a bushing 7 provided with outwardly extending metal fibres 13. The metal fibres 13 are arranged in unidirectional fibre bundles 204. Each bundle 204 is firmly fixed to the second end 10 of the bushing 7. The bundle 204 is fixed to the second end 10 in separate circular rows. A first circular row is placed near the periphery of the second end 10 and a second circular row is placed inwardly of the first row. The bushing 7 and the fibre bundles 204 are embedded in the polymer matrix of the fibre-reinforced composite material of the root region. Additional fibres, such as steel fibres or fibres of a different material than metal, are preferably placed in the area between the bundles 204. The fibre bundles 204 are firmly fixed to the bushings 7 as explained above.

Figure 6B:
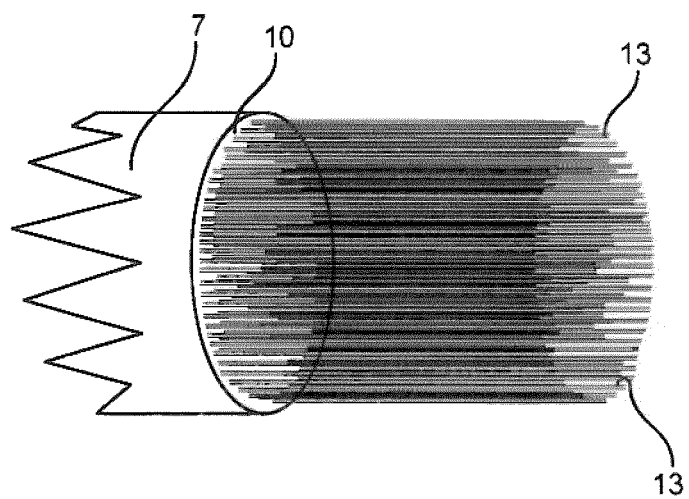
FIG. 6B shows a fourth embodiment of an elongated fastening member provided with metal fibres firmly fixed thereto.

FIG. 6B shows a fourth embodiment of a bushing 7 comprising metal fibres 13. The metal fibres 13 are arranged unidirectionally and each of the fibres is separately firmly fixed to the bushing 7.

Figure 7:
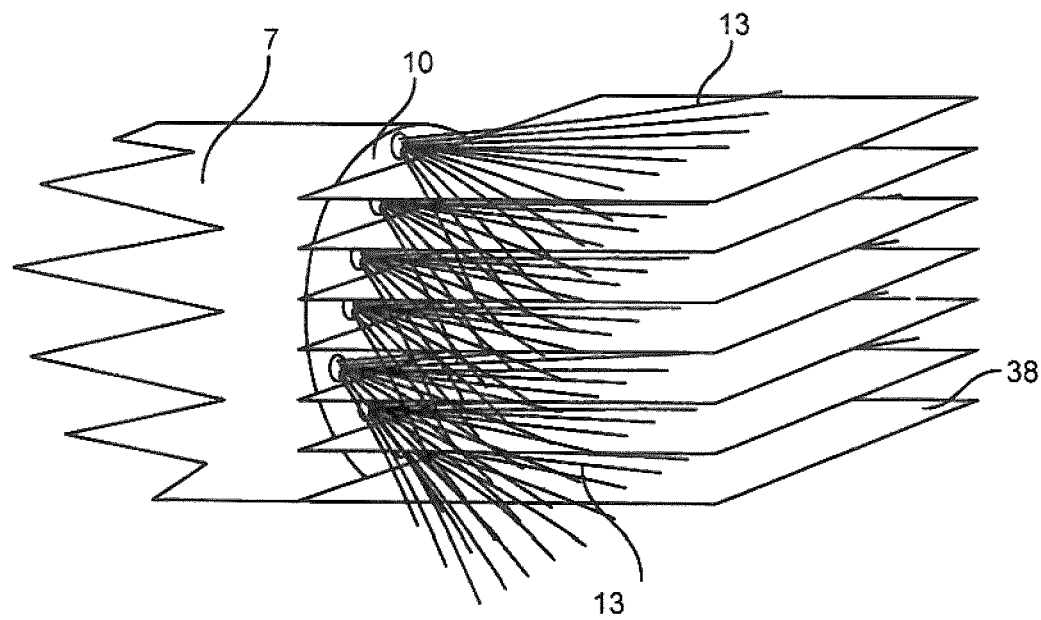
FIG. 7 shows a fifth embodiment of an elongated fastening member provided with metal fibres firmly fixed thereto.

FIG. 7 shows a fifth embodiment of a bushing 7 comprising metal fibres 13. The metal fibres 13 are firmly fixed to the second end 10 in bundles 204 and are arranged multidirectionally. As shown, layers of a second fibre material 38 different from metal fibres are arranged between the fibre bundles 204 extending from the second end 10 of the bushing 7 so as to substantially form a fan. However, as shown, some of the metal fibres 13 may cross and pass through the layers of the second fibre material 38 different from metal fibres. As mentioned above, the bushings 7, the metal fibres 13 and the second fibre material 38 are embedded in the polymer matrix of the fibre-reinforced composite material of the root region. Preferably, the layers of the second fibre material 38 are made of glass and/or carbon fibres.

Figure 8:
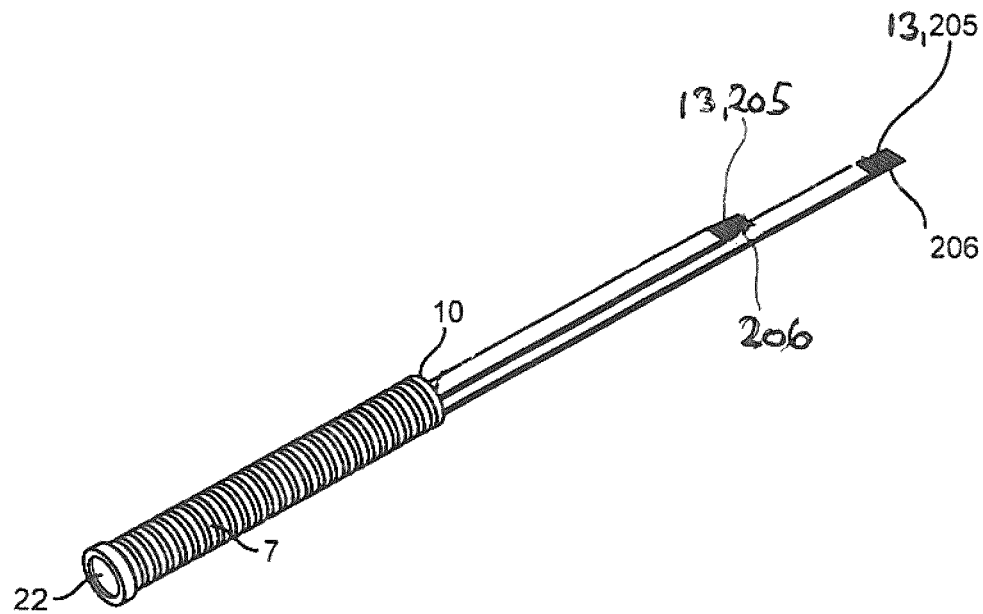
FIG. 8 shows a sixth embodiment of an elongated fastening member provided with metal fibres firmly fixed thereto.

FIG. 8 shows a sixth embodiment of an elongated bushing 7 provided with metal fibres 13. The metal fibres 13 are arranged in separate layers 205 of metal fibres 13, said layers being in form of fibre bundles, fibre mats or fibre strips. A first end of the fibres bundles, mats or strips is firmly fixed to the second end 10 of the bushing 7. Between layers 205 of metal fibres 13, a layer 206 of a second fibre material different from metal is arranged. The layers 205 of metal fibres and the layer 206 of a second fibre material are embedded in the polymer matrix of the fibre-reinforced composite material of the root region.

The metal fibres, filaments or wire may have a cross-sectional dimension in the range between 0.04 mm and 1.0 mm, or in the range between 0.07 mm and 0.75 mm, or in the range between 0.1 mm and 0.5 mm. In some of the embodiments of the longitudinal fastening members, such as the bushing 7, the metal fibres may be formed into fibre mats, strips or bundles which may be unidirectional mats, strips or bundles, multidirectional mats, strips or bundles, woven mats or strips, or mats or strips comprising chopped fibres. Additionally, the metal fibres, filaments or wires may be incorporated into mats, strips or bundles comprising a different type of fibres than metal fibres, such as carbon fibres and/or glass fibres, i.e. the metal fibres may be incorporated into so-called hybrid mats, strips or bundles.

The percentage by volume of metal fibres in the mats, strips or bundles may be 20, 30, 40, 50, 60, 70, 80 90 or 100, the remaining fibres being a different type of fibres, preferably glass and/or carbon fibres. Correspondingly, the percentage by volume of metal fibres in the root region, where metal fibres are provided, may be 20, 30, 40, 50, 60, 70, 80 90 or 100, the remaining fibres being a different type of fibres, preferably glass and/or carbon fibres.

Figure 10:
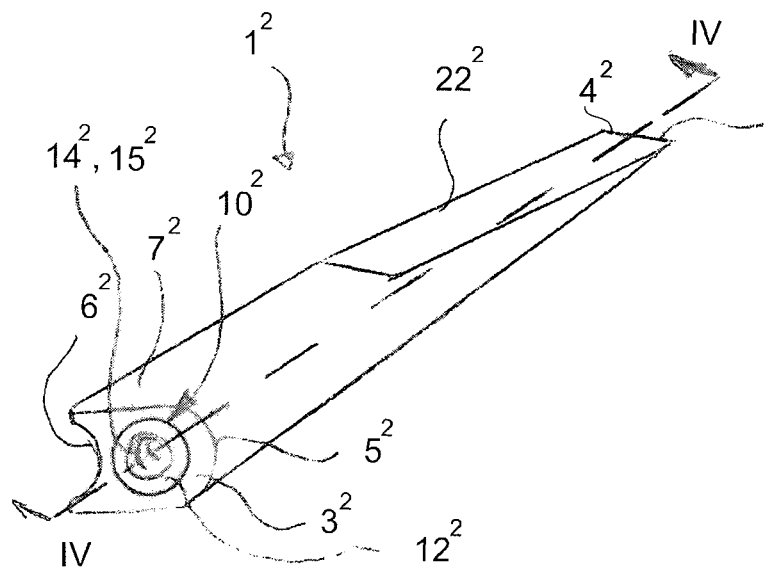
FIG. 10 is a diagrammatic perspective view of a first embodiment of an embedding element according to the invention.
Figure 11:
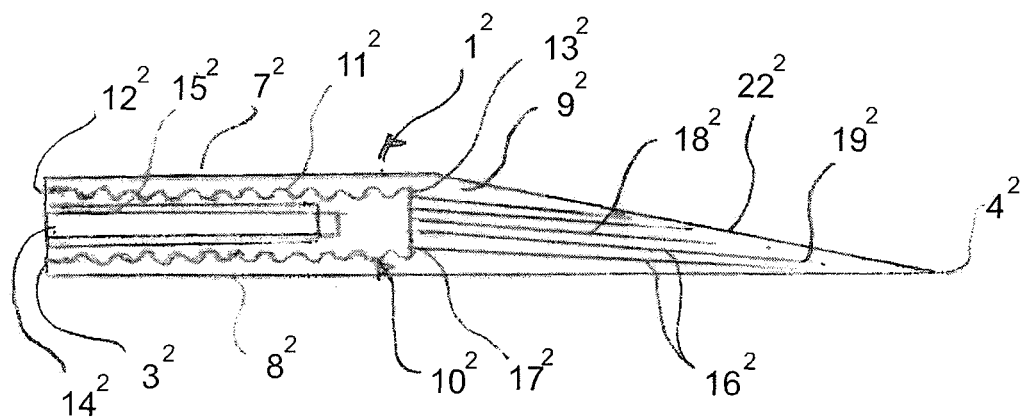
FIG. 11 is a longitudinal view along the line IV-IV in FIG. 10.

The embodiment of the embedding element $1^2$ according to the invention shown in FIGS. 10 and 11 is elongated and has a first end $3^2$ and an opposite second end $4^2$, a first longitudinal lateral face $5^2$ and an opposite second longitudinal lateral face $6^2$. Further, the embedding element has an upper face $7^2$ and a lower face $8^2$ interconnecting the longitudinal lateral face $5^2$, $6^2$. The first longitudinal lateral face $5^2$ extends substantially convexly in a cross-sectional view of the embedding element and the second longitudinal lateral face $6^2$ extends substantially correspondingly concavely in a cross-sectional view of the embedding element $1^2$. The upper face $7^2$ and the lower face $8^2$ are essentially parallel at least over about half the length thereof. Over a remaining portion $22^2$ of the length of the upper face $7^2$, the upper surface taper gradually towards the lower face $8^2$ so as to form a wedge shaped embedding element $1^2$.

The embedding element $1^2$ is formed of a fibre-reinforced composite material $9^2$ comprising fibres embedded in a polymer matrix. The fibres may be glass fibres and/or carbon fibre and/or metal fibres, such as preferably steel or iron fibres and the polymer matrix may be a resin such a polyester, epoxy or vinylester.

In the fibre-reinforced composite material $9^2$ of the embedding element $1^2$, an elongated fastening element $10^2$ is embedded. The elongated fastening element $10^2$ has an outer surface $11^2$, a first end $12^2$ and an opposite second end $13^2$. Additionally, the elongated fastening element $10^2$ is provided with an inner longitudinal bore $14^2$ extending from the first end $12^2$ thereof and being provided with an inner thread $15^2$.

In the embodiment shown in FIGS. 10 and 11, the elongated fastening element $10^2$ has a substantially circular cylindrical shape, the outer surface $11^2$ thereof being however corrugated.

The elongated fastening element $10^2$ is provided with metal fibres $16^2$, preferably formed by iron or steel. A first end $17^2$ of the metal fibres $16^2$ is firmly fixed to the second end $13^2$ of the fastening element $1^2$ and a portion $18^2$ extends essentially axially outwardly from said second end and ends in a second end $19^2$ of the metal fibres $16^2$.

As described below with reference to FIGS. 12 and 13, the embedding element $1^2$ may be manufactured by pultrusion in a pultrusion system $40^2$. Pairs $20^2$, $20^{2'}$ of fastening elements are formed by connecting opposite ends of metal fibres $16^2$ to second ends $13^2$, $13^{2'}$ of two fastening elements $10^2$, $10^{2'}$ facing each other as shown in FIG. 13. Further, a rod $21^2$ of preferably a fibre-reinforced polymer may with its opposite ends be fastened to the second ends $13^2$, $13^{2'}$ of the fastening elements $10^2$, $10^{2'}$ facing each other. Thereby, the pairs $20^2$, $20^{2'}$ of fastening elements have at least a certain ridigity. Thereafter pairs $20^2$, $20^{2'}$ of fastening elements are mutually connected by means of threaded rods $30^2$ preferably made of plastic threaded into the inner thread $15^2$ in the inner longitudinal bore $14^2$ in the first ends $12^2$, $12^{2'}$ of juxtaposed pairs of fastening elements $10^2$, $10^{2'}$, whereby a string $37^2$ of fastening elements has been formed.

The string $37^2$ of fastening elements is as illustrated in FIG. 13 introduced into the pultrusion system $40^2$, comprising a receiving section $41^2$ together with webs or bundles of fibre-reinforced materials such as webs or bundles of glass fibres and/or carbon fibres and/or metal/fibres. The webs or bundles of fibres are designated with the reference number $42^2$ and $43^2$. From the receiving section $41^2$ a string $44^2$ comprising the string $37^2$ of fastening elements and the fibre webs or bundles $42^2$, $43^2$ is introduced into a resin applicator and resin heating and curing apparatus $45^2$ with a resin reservoir $46^2$, to supply resin thereto. The string $44^2$ that has been saturated with resin in the resin applicator and resin heating and curing apparatus $45^2$ leaves said apparatus through a nozzle $46^2$ from which a pultruded string $47^2$ extends having a cross-section of the embedding element $1^2$ in the not-tapered portion thereof. The pultruded string $47^2$ is extracted from the nozzle by means of a pulling device $48^2$. On the downstream side of the pulling device $48^2$, a cutting device $49^2$ is arranged. The cutting device $49^2$ cuts the pultruded string between to fastening elements $10^2$, i.e. the area where the fastening elements $10^2$, $10^{2'}$ are connected first end $10^2$ against first end $10^2$ by means of the threaded rod $30^2$. Thereby, a blank $50^2$ comprising two embedding elements $10^2$, $10^{2'}$ is provided.

FIG. 12 illustrates how this blank $50^2$ is cut through along an inclined cutting line $51^2$ extending between the upper and lower face thereof. Thereby, two identical embedding elements $10^2$, $10^2$, are provided, the cut along the inclined cutting line $51^2$ providing the tapering portion $22^2$ of the upper face $7^2$ of the embedding elements.

Figure 14:
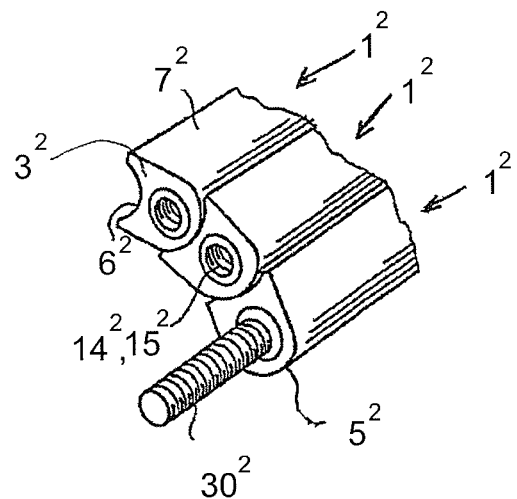
FIG. 14 is a schematic view of a portion of three embedding elements according to the invention arranged so that the lateral faces thereof abut each other.

As shown in FIG. 14, several embedding elements $1^2$ may be arranged in parallel to allow the convex lateral faces $5^2$ to engage the concave lateral faces 6 and such that the first ends $3^2$ of the embedding elements $1^2$ are placed in a common plane. Due to the concave and convex lateral faces the embedding elements $1^2$ may form a curve, such as a circle in a plane perpendicular to the longitudinal axis of the embedding elements $1^2$.

Figure 15:
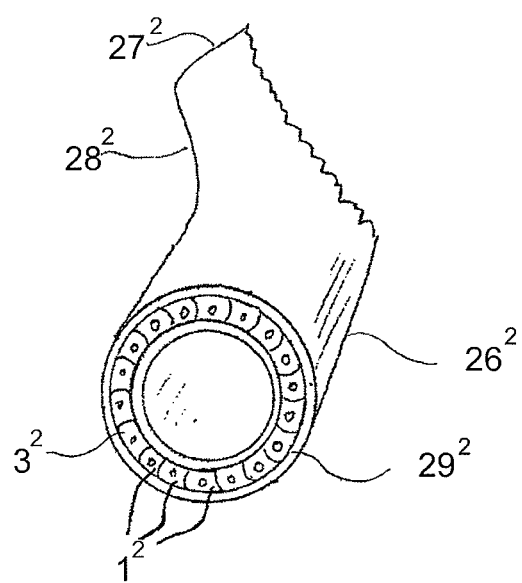
FIG. 15 is a perspective view the root of a wind turbine blade with embedding elements embedded in the root region thereof.

FIG. 15 illustrates the root region $26^2$, the transition region $28^2$ and a portion of the airfoil region $27^2$ of a wind turbine blade made of a fibre composite material, and wherein embedding elements $1^2$ according to the invention have been embedded in the root along the circumference thereof, such as to allow access to the threaded holes $14^2$, $15^2$ of the embedding elements $1^2$ from the root end face $29^2$ of the blade root. The embedding element $1^2$ has been arranged in the manner disclosed in FIG. 14, wherein the first lateral face of each embedding element engage the second lateral face of the juxtaposed embedding element.

The fibre-reinforced composite material of the root region, wherein the embedding elements 1 are embedded comprises fibres embedded in a polymer matrix. The fibres are preferably glass and/or carbon and/or metal fibres preferably steel fibres and the polymer may be a resin such as polyester, epoxy and vinylester.

LIST OF REFERENCE NUMERALS

2 Wind turbine blade
3 Outer surface of root
4 Inner surface of root
5 Outer layer
6 Inner layer
7 Elongated fastening member (bushing)
9 First end of fastening member
10 Second end of fastening member
11 Outer periphery of fastening member
12 Central bore
13 Metal fibres
16 First layer comprising metal fibres
17 Wedge-shaped element
18 First end of element
19 Second end of element
22 Fastening means (inner threads)
23 Hub
24 Wind turbine
25 Nacelle
26 Root region
27 Airfoil region
28 Transition region
29 Root end face
31 Blade root
32 Blade tip
33 Trailing edge
34 Leading edge
35 Chord plane
36 Tower
37 Second layers
38 Second fibre material
39 Insert
40 First insert part
41 Second insert part
42 Lateral face of insert
43 Lateral face of insert
46$^{2'}$ Resin reservoir
201 First fibre end
202 Second fibre end
203 Outwardly extending portion of metal fibres
204 Metal fibre bundle
205 Separate layer of metal fibres
206 Layer of a second fibre material
$1^2$ Embedding element
$3^2$ First end of embedding element
$4^2$ Second end of embedding element
$5^2$ First longitudinal lateral face
$6^2$ Second longitudinal lateral face
$7^2$ Upper face
$8^2$ Lower face
$9^2$ Fibre-reinforced composite material of the embedding element
$10^2$ Elongated fastening element
$11^2$ Outer surface of elongated fastening element
$12^2$, $12^{2'}$ First end of fastening element
$13^2$, $13^{2'}$ Second end of fastening element
$14^2$ Longitudinal bore
$15^2$ Inner thread
$16^2$ Metal fibres
$17^2$ First end of metal fibres
$18^2$ Portion of metal fibres
$19^2$ Second end of metal fibres
$20^2$, $20^{2'}$ Pairs of fastening elements
$21^2$ Rod
$22^2$ Tapering portion of upper face
$30^2$ Threaded rod made of plastic
$37^2$ String of fastening elements
$40^2$ Pultrusion system
$41^2$ Receiving section
$42^2$ Webs of fibres
$43^2$ Bundles of fibres
$44^2$ String
$45^2$ Resin applicator heating and curing apparatus
$46^2$ Nozzle
$47^2$ Pultruded string
$48^2$ Pulling device
$49^2$ Cutting device
$50^2$ Blank
$51^2$ Inclined cutting line

The invention claimed is:

1. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in a longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and optionally a transition region between the root region and the airfoil region, the root region having a ring-shaped cross section with an outer surface and an inner surface, the root region comprising a plurality of elongated fastening members provided with fastening means and embedded mutually spaced apart in the fibre-reinforced polymer matrix so as to substantially follow a circumference of the root region and allow access from the outside to the fastening means used for mounting the blade to the hub, the elongated fastening members each comprising an outer surface, a first end arranged at the root end face, a second end opposite the first end thereof, a first lateral face, and an opposite second lateral face, wherein at least one of the elongated fastening members comprises metal fibres, a first end thereof being firmly fixed to the fastening member and the remaining portion thereof extending outwardly from the fastening member and being embedded in the polymer matrix of the fibre-reinforced composite material, the metal fibres extending from the fastening members so as to be arranged in at least one separate layer of the fibre-reinforced composite material, wherein the remaining portion of each said metal fibre extends through, and is surrounded by, the polymer matrix, adjacent ones of the remaining portions of the metal fibres being separated from one another by a portion of the polymer matrix.

2. The wind turbine blade according to claim 1, wherein the metal fibres extend from the fastening members so as to be arranged in an at least one separate layer of the fibre-reinforced composite material.

3. The wind turbine blade according to claim 1, wherein the outwardly extending portion of the metal fibres end in a second fibre end.

4. The wind turbine blade according to claim 1, wherein the metal fibres are firmly fixed to the second end of the fastening member.

5. The wind turbine blade according to claim 1, wherein the metal fibres are firmly fixed to an outer peripheral surface of the fastening member.

6. The wind turbine blade according to claim 1, wherein the metal fibres are firmly fixed to the fastening member by casting, gluing, soldering, or brazing.

7. The wind turbine blade according to claim 1, wherein at least 50% of the fastening members are provided with firmly fixed metal fibres.

8. The wind turbine blade according to claim 7, wherein at least 60% of the fastening members are provided with firmly fixed metal fibres.

9. The wind turbine blade according to claim 8, wherein at least 70% of the fastening members are provided with firmly fixed metal fibres.

10. The wind turbine blade according to claim 9, wherein at least 80% of the fastening members are provided with firmly fixed metal fibres.

11. The wind turbine blade according to claim 10, wherein at least 90% of the fastening members are provided with firmly fixed metal fibres.

12. The wind turbine blade according to claim 11, wherein 100% of the fastening members are provided with firmly fixed metal fibres.

13. The wind turbine blade according to claim 1, wherein an E-modulus of the metal fibres is at least twice an E-modulus of glass fibres.

14. The wind turbine blade according to claim 13, wherein the E-modulus of the metal fibres is thrice the E-modulus of glass fibres.

15. The wind turbine blade according to claim 13, wherein the metal fibres comprise steel fibres.

16. The wind turbine blade according to claim 1, wherein the metal fibres have a cross section in a range between 0.04 mm and 1.0 mm.

17. The wind turbine blade according to claim 16, wherein the range is between 0.07 and 0.75 mm.

18. The wind turbine blade according to claim 17, wherein the range is between 0.1 and 0.5 mm.

19. The wind turbine blade according to claim 1, wherein the metal fibres are fixed to the fastening member as a bundle of fibres.

20. The wind turbine blade according to claim 1, wherein the metal fibres extend outwards from the fastening members in a mutually diverging manner.

21. The wind turbine blade according to claim 1, wherein the fastening members are bushings, and the fastening means is a thread in a bore in the bushing.

22. The wind turbine blade according to claim 21, wherein the bushings comprise a uniform cross section.

23. The wind turbine blade according to claim 1, wherein the fastening members are made of metal.

24. The wind turbine blade according to claim 23, wherein the metal comprises steel.

25. The wind turbine blade according to claim 1, wherein the root region further comprises intermediate retaining means comprising metal fibres and arranged in regions between adjacent interspaced lateral surfaces of the fastening members, preferably in each region between adjacent fastening members, and preferably extending at least from the first to the second end of the fastening members when seen in the longitudinal direction of the blade.

26. The wind turbine blade according to claim 25, wherein the metal fibres comprise steel fibres.

27. The wind turbine blade according to claim 25, wherein the intermediate retaining means are in each region between adjacent fastening members and extend at least from the first to the second end of the fastening members when seen in the longitudinal direction of the blade.

28. The wind turbine blade according to claim 25, wherein the intermediate retaining means comprises a number of first layers comprising metal fibres.

29. The wind turbine blade according to claim 28, wherein the intermediate retaining means comprises a number of intermediate second layers comprising a different type of fibres than metal fibres.

30. The wind turbine blade according to claim 28, wherein the different type of fibres comprises glass and/or carbon fibres.

* * * * *